United States Patent [19]

Way

[11] 4,077,582
[45] Mar. 7, 1978

[54] DEEP SEA FISHING REEL

[76] Inventor: Merton B. Way, 5300 John R Rd., Troy, Mich. 48084

[21] Appl. No.: 645,384

[22] Filed: Dec. 30, 1975

[51] Int. Cl.² .................................... A01K 89/02
[52] U.S. Cl. ...................... 242/219; 242/84.1 R; 242/84.5 R
[58] Field of Search ............ 242/84.5 R, 84.51 R, 242/211, 212, 213, 214, 218, 219, 220, 221, 84.1 R

[56] References Cited

U.S. PATENT DOCUMENTS

| | | | |
|---|---|---|---|
| 1,995,221 | 3/1935 | Peel et al. | 242/84.5 R |
| 2,180,566 | 11/1939 | Thompson | 242/84.51 R |
| 3,478,977 | 11/1969 | Sarah | 242/212 |
| 3,708,137 | 1/1973 | Jones | 242/84.5 R |

Primary Examiner—Billy S. Taylor
Attorney, Agent, or Firm—Gerald R. Hershberger

[57] ABSTRACT

A deep sea fishing reel comprised of a support assembly having a foot for securing the fishing reel to the fishing pole and a ratchet gear fixedly contained on said support. A spool and a spool ratchet control assembly rotatably mounted on said support assembly connected to said gear and spool. A ratchet control lever is conveniently located on the spool rotating mechanism body for engaging and disengaging said ratchet gear. A double acting disc drag assembly is connected to said spool drive assembly to regulate the spool rotation tension on the fishing line when said ratchet is engaged. The spool, spool ratchet release assembly and drag assembly rotate freely when the ratchet is disengaged.

2 Claims, 5 Drawing Figures

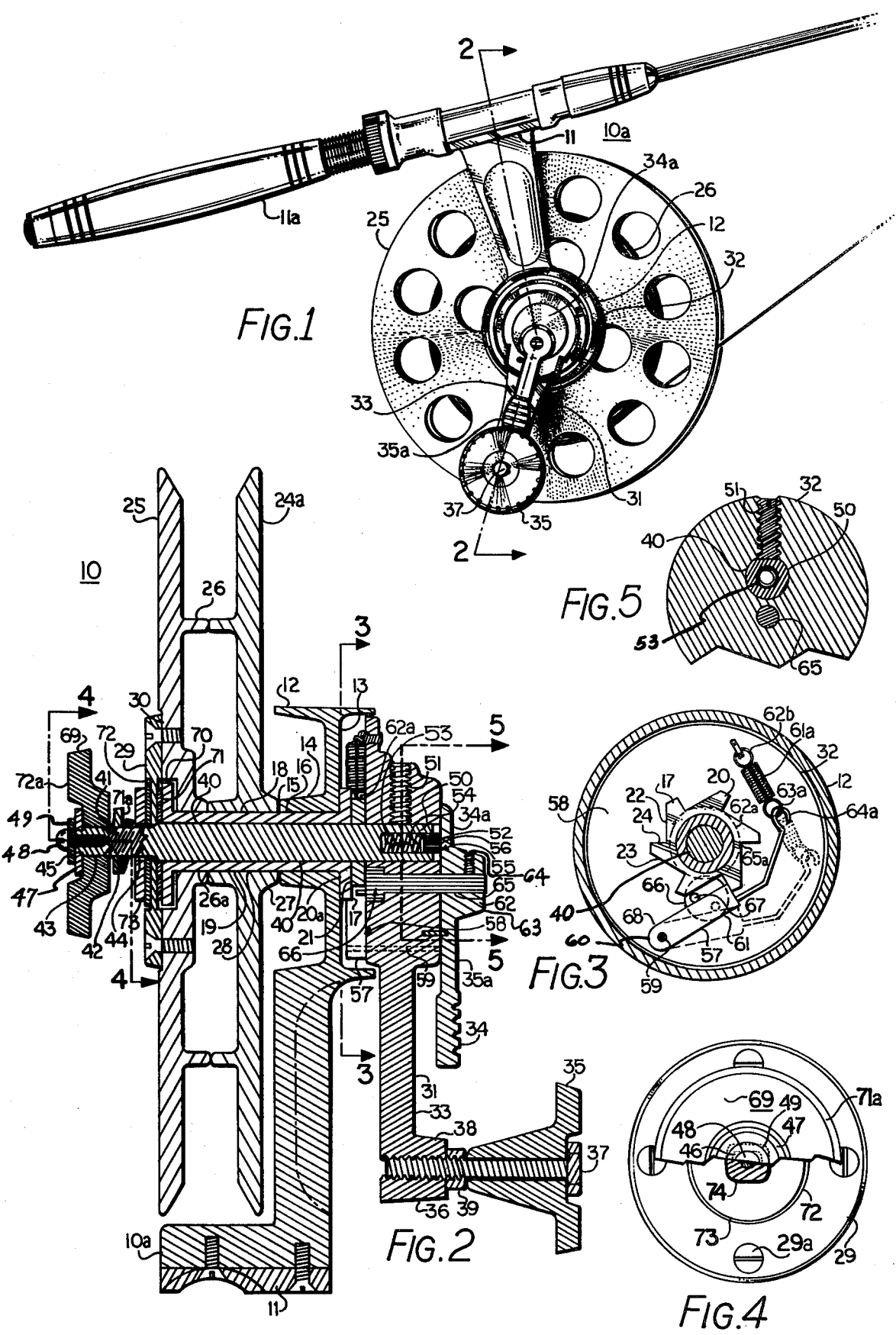

:::: 4,077,582

DEEP SEA FISHING REEL

BACKGROUND OF THE INVENTION

1. Field of the Invention

This invention relates to deep sea fishing reels or more particularly to a deep sea reel having a drag releasing mechanism mounted on the spool rotation handle and a drag mechanism incorporated therein to get a positive drag effect on the rotation of the spool.

2. Description of the prior art

Device of this general character are known in the prior art for deep sea fishing purposes. However, no readily accessible means have been provided in the prior art for convenient, accessible manipulation of the ratchet release mechanism and a simple but positive drag mechanism incorporated into the reel for controlling rotation of the spool when the drag mechanism is engaged.

SUMMARY OF THE INVENTION

Accordingly the problem and difficulties that are encountered in the prior art are obviated by the present invention, in which I provide a ratchet release element which is combined with and directly connected to the spool rotating mechanism. In connection with the ratchet mechanism I incorporate a unique and positive double disc braking feature for regulating the tension on the spool when fishing. My fishing reel is compact and inexpensive to manufacture, efficient in operation, convenient, and safe to use while fishing.

An object of my invention is stated in the above ABSTRACT OF DISCLOSURE.

It is another object of my invention to provide a readily releasable conveniently located ratchet release mechanism for providing one way rotation of the fishing line spool of a fishing reel.

It is another object of this invention to provide a simple but positive double action disc drag braking mechanism to control the rotation tension of the fishing line spool of a fishing reel in cooperation with the ratchet release mechanism.

It is another object of this, my invention, to provide a fishing reel having a drag release mechanism incorporated into the spool rotation handle combined with a double acting disc drag braking mechanism responsive to said ratchet release mechanism for disconnecting the drag mechanism and for regulating the tension on the fishing reel spool.

Other further objects of this, my invention, will become apparent from the following description of the drawing, the description of the preferred embodiment and the appended claims.

BRIEF DESCRIPTION OF DRAWING

The present invention may be better understood and numerous other features and advantages thereof will become apparent to those skilled in the art by references to the accompanying drawing wherein like reference numerals refer to like elements in the various figure in which:

FIG. 1 is a pictoral view of my fishing reel attached to a fishing rod in an underslung manner so that the reel may be operated with the right hand while the rod is mounted on the gunwale of a fishing boat or held by the operator.

FIG. 2 is a sectional view taken along lines 2 — 2 of FIG. 1, showing the internal construction of my device.

FIG. 3 is a sectional view taken along lines 3 — 3 of FIG. 2 showing the construction of my ratchet mechanism.

FIG. 4 is a view taken along line 4 — 4 of FIG. 2 showing the assembly of my drag knob.

FIG. 5 is a view taken along line 5 — 5 of FIG. 2 showing the relationship of the drag lever, drive shaft and drag control shaft.

DESCRIPTION OF THE PREFERRED EMBODIMENT

Referring now in detail to the drawing, particularly to FIG. 2, my fishing reel is denoted generally by the numeral 10, it is shown as including an elongated reel spool to fishing rod 11a and hanger means 10a having a reel mounting portion 11 at one end and a reel spool supporting portion 12 including a generally recessed flat ratchet gear hanger face 13, a recessed hub 14, a hub face 15, and an internal bearing opening 16 through said hub and gear face.

A ratchet gear and elongated sleeve means 17 has the sleeve portion 18 fixedly journaled in said hanger bearing opening 16 with a substantial extended portion 19 of said sleeve portion extending outwardly from said hub of said hanger and an external enlarged gear toothed portion 20 formed at the end of said sleeve portion with the gear inner face 20a generally engaging said hanger face 13. The gear portion having an outer face 21 and a plurality of external teeth 22, each of which teeth being provided with a peripheral tooth face 23 sloped radially in one direction, clockwise for right handed operation, and a tooth face 24 radially non-sloped in the other direction.

I provide a reel spool means 24a which includes a generally flat, large diameter, 2-piece lightweight aluminum cored fishing line spool member 25 having an annular recessed line holding portion 26, a hub portion 27 adjacent said hanger hub, said spool hub having an internal centrally formed bearing portion 26a rotatably journaled on the outside periphery 28 of said extended sleeve portion and a brake drum plate element 29 fixedly mounted on the generally flat outside face 30 of said spool member, by screws 29a, I further provide a spool rotation and drag control means 31 which has a spool and drag control body 32, an elongated spool and drag rotation handle 33 integrally formed and extending from said body, and an elongated release thumb lever member 34 having a flatted portion 34a and a thumb operable portion 35a extending generally parallel to said spool handle but shorter than said handle which thumb lever terminates adjacent said spool handle knob 35, which knob 35 is rotatably and transversely connected to the extremity 36 of said handle by a screw 37 extending through said knob 35 and threaded into the handle boss 38 and fixedly held in place by check nut 39 engaging said hub. An elongated laterally floatable spool drive shaft member 40 is rotatably journaled in said sleeve portion, the free end 41 of said shaft is threaded 42, and flattened 43 on said free end for a portion thereof 44 extending outwardly of said brake drum element 29. The extreme end 45 of said shaft being squared 46 to receive a non-rotatable washer 47 and having an axial screw 48 to secure back-up washer 49 to said extreme end of said shaft. The other end 50 of said shaft is journaled centrally in said body and stopped from rotating therein by set screw 51. End play means 52 is mounted in blind bore 53 in the other end of said shaft and has a coil spring 54 and a plunger member 55 contained in said bore, said plunger forceably engaging said spring so that the plunger end 56 is resiliently pressed against said flatted portion 34a of said lever to put light end wise pressure on said lever and shaft to hold said lever in place.

An elongated, generally rectangularly outlined pawl male member 57 is pivotably mounted on the inner generally flat face 58 of said body by a dowel 59 pressed into said body face 58 and extending through outer end 60 of said pawl, the free pawl end 61 is biased towards said gear teeth or female portion 65a by means of a tension spring 61a which has one end 62b mounted on said body flat face and the other end 63a mounted on said pawl free end by means of pawl extension member 64a which is arched outwardly to clear said teeth. A said body is rotated by said body handle said pawl free end alternatively slides over said sloped or inclined plane portion of said tooth when said body is rotated in one direction, and engages a non-sloped or non-inclined plane portion of a tooth when the body is rotated in the other direction. Annular spacer washer 62a laterally spaces body face 58 away from said hanger face 13 to allow enough room for said pawl to move freely but still engage said teeth 22.

A drag release means 62 includes said release lever and a drag release bolt 65 fixedly fastened to lever hub 63 by means of set screw 64, the bolt 65 extends through said body parallel but off center of said drive shaft and has a head portion 66 terminating flush with said body face, a pin or abutment 67 is eccentrically located on said bolt head extends inwardly from said body base engaging the under side 68 of said pawl outwardly from said pivot or pin 59 so that when said lever is rotated said abutment moves said free end of said pawl in or out engagement with said gear teeth.

An adjustable drag brake means 69 is connected to said reel spool and has a generally flat disc portion 70 fixedly and transversely mounted on said shaft adjacent said spool outer face for rotation with said shaft. One generally thin annular, fiber, friction brake shoe member 71 is axially mounted on said shaft inwardly and adjacent said drum plate and said shaft disc and another thin, annular fiber friction brake shoe 72 is mounted outwardly and adjacent said brake plate. A laterally, axially floating shoe engaging disc member 73 has an elongated slotted opening 74 engaging the flatted portion of said shaft threaded end to prevent radial motion thereof with respect to said shaft.

I further provide a brake shoe annular compression spring member 71a mounted axially on said drive shaft adjacent said outwardly located brake disc, and a spool drag adjusting knob 72a threadably engaging said threaded portion of said drive shaft so that rotating said drag knob inwardly gradually selectively compresses said shoe compression member compressing said shoes towards each other simultaneously and equally against the sides of said brake drum with equal force.

In operation I mount my reel device, which is preferably substantially all aluminum construction for lightness, on a deep sea type fishing pole, and let out enough line for the sinker to hit bottom. I then tighten the drag to the desired tension in proportion to the speed of my boat and the weight of the sinker, so the line does not reel out by itself. If the bottom depth gets less or as I troll, I can rotate the spool handle clockwise without interference from the ratchet feature, but if the bottom recedes and it is necessary for me to let out more line, I do not have to loosen the drag mechanism, I simply release the ratchet holding the spool by moving the conveniently located drag release lever to release the ratchet and the spool turns easily until the proper depth is reached and I then reset the lever to holding position.

Many modifications may be made by those who desire to practice the invention without departing from the scope thereof, which is defined by the following claims:

I claim:

1. In a fishing reel, the combination of, an elongated reel spool to fishing rod hanger means having a base reel mounting portion at one end and a reel spool supporting portion having an internal bore, a ratchet gear face and a hub face at the other end;

ratchet gear means including a sleeve portion fixedly mounted in said hanger internal bore with a substantial portion of said sleeve extending outwardly from said reel supporting portion and a gear tooth portion formed inwardly from said reel supporting portion adjacent said hub face, said gear tooth portion having a plurality of external teeth each tooth having an inclined portion sloped radially in one direction and a portion generally non-sloped radially in the other direction;

a reel spool means including a generally large diameter flat spool member having an annular recessed fishing line holding portion, a hub portion including an internal centrally located bearing portion rotatably journaled on the outside periphery of said extended portion of said sleeve a generally flat outside face and a brake drum plate element fixedly mounted to said outside face of said spool member having a shaft opening located axially with respect to said spool bore; spool rotation and drag control means including a spool rotation handle body, an elongated spool rotation handle portion extending from said body, and an elongated laterally floating spool drive shaft member journaled in said sleeve, one end of said shaft being threaded and extending outwardly beyond the brake drum element and the other end of which shaft is fixedly connected to said spool rotation handle body;

said handle body including an inwardly directed face upon which is pivotably mounted a ratchet gear pawl member spring biased towards said teeth of said gear toothed portion and fixed to rotate with said body so that as said handle body is rotated by said handle said pawl alternatively slides over said inclined portion of a tooth in one rotational direction or engages a non-sloped face of said gear tooth stopping rotation in the other rotational direction;

drag and spool release means including a release member and a drag release bolt member having one end fixedly fastened to said lever member and the other end extending parallel to but off center of said drive shaft extending through said handle body, said other end terminating generally flush with the internal face of said handle body, a pawl release element connected to said drag bolt other end adjacent said pawl so that rotation of said lever actuates said release element to move said pawl in or out of engagement with said gear teeth;

and adjustable drag means associated with the end of said drive shaft member including a pair of generally thin friction fiber brake shoe axially mounted on said shaft straddling the sides of said drum plate element, a generally flat friction shoe engaging disc portion fixedly mounted to rotate with said drive shaft member adjacent the inwardly located friction shoe, an outwardly located floating friction shoe engaging disc member constrained to rotate with said shaft but free to move laterally axially on said drive shaft adjacent to said outwardly located brake disc, a spring element mounted on said drive shaft adjacent said outwardly located brake disc, a drag adjusting knob threadably mounted on said threaded end of said drive shaft so that turning said drag knob gradually compresses said spring element laterally moving said discs toward each other compressing said shoes against the sides of said brake drum with manually regulatable equal pressure.

2. In a fishing reel, the combination of, an elongated reel spool to fishing rod hanger means having a base reel mounting portion at one end and a reel spool supporting portion having an internal bore, a ratchet gear face and a hub face at the other end;

ratchet gear means including a sleeve portion fixedly mounted in said hanger internal bore with a substantial portion of said sleeve extending outwardly from said reel supporting portion and a gear tooth portion formed inwardly from said reel supporting portion adjacent said hub face, said gear tooth portion having a plurality of external teeth each tooth having a portion sloped radially in one direction and a portion generally non-sloped radially in the other direction;

a reel spool means including a generally large diameter flat spool member having an annular recessed fishing line holding portion a hub portion including an internal centrally located bearing portion rotatably journaled on the outside periphery of said extended portion of said sleeve and a brake drum plate element fixedly mounted to the outward side of said spool member having a shaft opening located axially with respect to said spool bore;

spool rotation and drag control means including a spool rotation body, an elongated spool rotation handle portion extending from said body, and an elongated laterally floating spool drive shaft member journaled in said sleeve, one end of said shaft being threaded and extending outwardly beyond the brake drum element and the other end of which shaft is fixedly connected to said spool rotation handle body;

said handle body including an inwardly directed face upon which is pivotably mounted a ratchet gear pawl member spring biased towards said teeth of said gear toothed portion and fixed to rotate with said body so that as said handle body is rotated by said handle said pawl alternatively slides over said inclined portion of a tooth in one rotational direction or engages a non-sloped face of said gear tooth stopping rotation in the other rotational direction;

drag and spool release means including a release lever member and a drag release bolt member having one end fixedly fastened to said lever member and the other end extending parallel to but off center of said drive shaft extending through said handle body, said other end terminating generally flush with the internal face of said handle body, a pawl release element connected to said drag bolt other end adjacent said pawl so that rotation of said lever actuates said release element to move said pawl in or out of engagement with said gear teeth;

and adjustable drag means associated with the end of said drive shaft member including a friction fiber brake shoe element axially mounted on said shaft in braking relationship to said drum plate element, a drag adjusting knob means including a hand knob selectively operable to resiliently engage or disengage said shoe element and said brake element to apply variable rotational drag to said spool when said pawl is in engagement with the disinclined portion of said gear tooth.

* * * * *